Aug. 25, 1942. P. M. SALERNI 2,293,766
HYDRAULIC POWER TRANSMISSION APPARATUS
Filed July 28, 1938 4 Sheets-Sheet 1

INVENTOR:
PIERO MARIANO SALERNI
BY Haseltine, Lake & Co.
ATTORNEYS

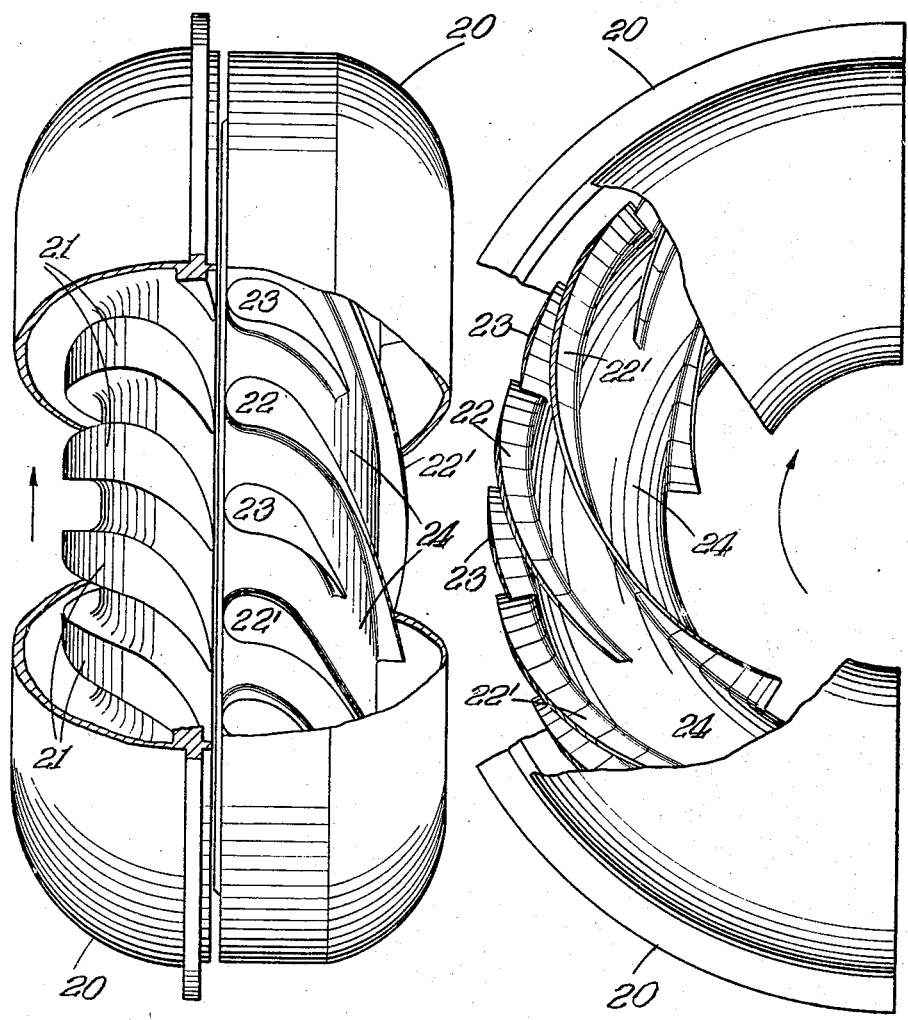

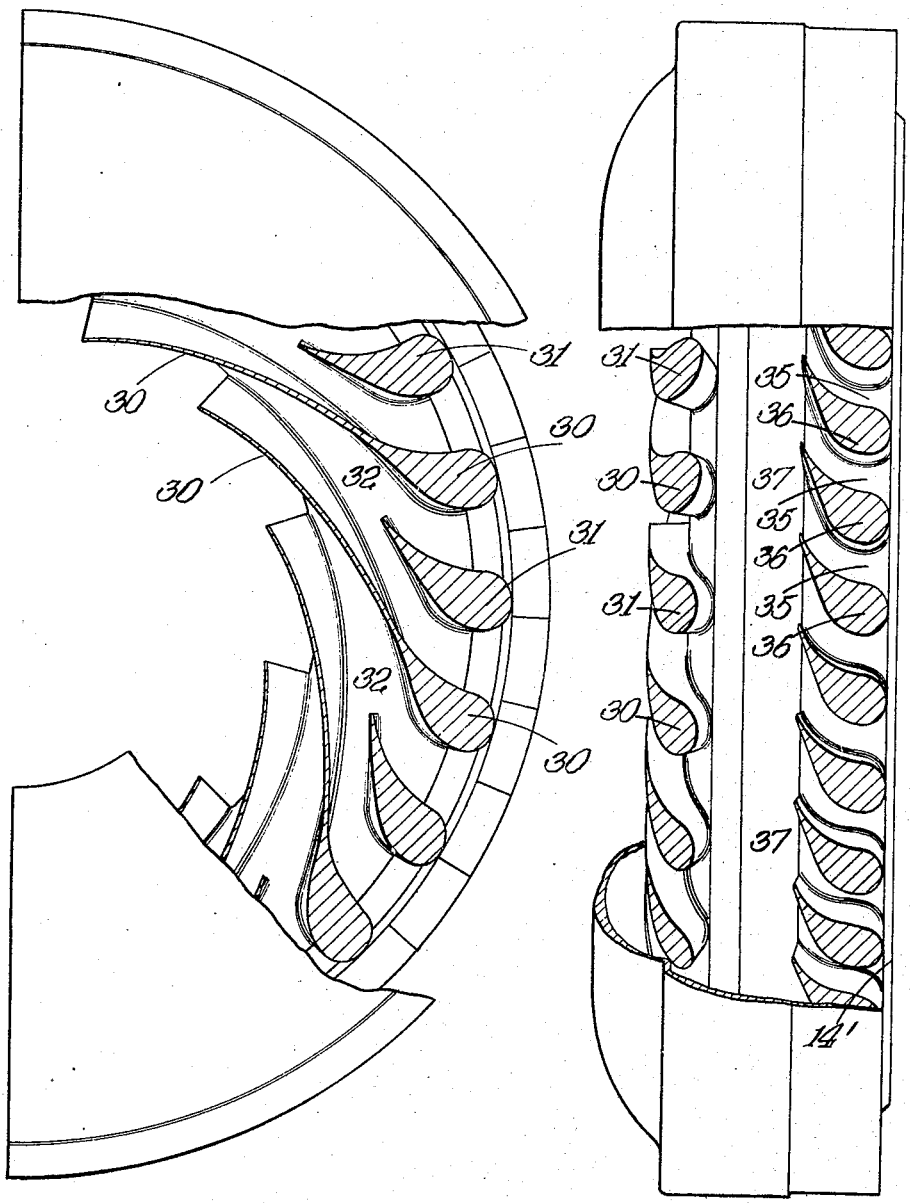

Patented Aug. 25, 1942

2,293,766

UNITED STATES PATENT OFFICE 2,293,766

HYDRAULIC POWER TRANSMISSION APPARATUS

Piero Mariano Salerni, London, England, assignor to Marie Thérèse Elisabeth Salerni, Virgilia, Eze, Nice, France Application July 28, 1938, Serial No. 221,812
In Great Britain August 6, 1937

7 Claims. (Cl. 60—54)

This invention relates to hydraulic power transmission apparatus of the kind wherein a rotary impeller or driving member drives by means of a liquid circulating in a closed circuit a turbine or driven member having ducts the inlets whereof are disposed in the said circuit at a radius (i. e. at a radial distance from the axis of rotation) larger than the radius at which their outlets are disposed, said ducts being formed between vanes which are not withdrawable from the liquid circuit (and which are hereinafter referred to as "fixed" vanes) and wherein the torque imparted by the hydraulic means to the turbine is or can be substantially greater than that imparted to the impeller whereby transmission of power may be effected by the hydraulic means at a torque ratio substantially greater than the ratio of 1 to 1 independently of any associated mechanical change speed gearing. This invention is concerned with the turbine.

According to this invention the turbine has ducts formed between fixed vanes, which ducts in a part commencing at or near their inlets, have a backwards curvature (i. e. are curved so as to deflect the liquid as it flows through this part in a direction having a component relative to the turbine opposite to the direction of rotation of the impeller) and thereafter have a general curvature opposite to such first-mentioned curvature.

Preferably the whole of this backwards curvature should take place as near as practicable to the inlet. It has been found in practice that a duct the direction of which at the inlet is approximately parallel to a plane containing the axis of rotation and the direction of which at the end of the backwardly curved part remote from the inlet is at an angle of about 60° to such a plane is satisfactory. It will be obvious that the part of the duct curved in this manner must be of sufficient length to enable the liquid to be turned backwards effectively without narrowing the ducts excessively.

From the point at which the backwards curvature terminates to or nearly to the outlet, the duct has a general curvature in a direction opposite to the said backwards curvature, i. e. this latter part of the duct, regarded as a whole, is oppositely curved. Preferably the whole of this latter part is oppositely curved and preferably the curvature is smooth and such as to conform to what would be the natural path of flow of the liquid after leaving the backwardly curved part, when the turbine is stationary, if the liquid were unrestrained by vanes in this part of the turbine, i. e. if the part of the vanes forming this part of the ducts were not there.

When the turbine is stationary, i. e. before it has begun to move angularly, the reaction due to the deflection of the liquid backwards, as it flows through the backwardly curved parts of the ducts, tends to rotate the turbine.

When the turbine rotates, power is transmitted also by the liquid being forced from the periphery of the turbine towards the axis. For the purpose of transmission by this method, it is desirable that the inlet and outlet of the ducts formed between the vanes shall be separated by as great a radial distance as practicable. The ducts must accordingly extend throughout a substantial radial height and preferably throughout almost the full radial height of the circuit.

The ducts may be formed between vanes which are continuous from the inlet of the turbine to the outlet. But the vanes need not be continuous and the ducts may be formed between successive annular series of vanes, which may be staggered or not, provided that there is no such gap as will result in undue shock and loss of efficiency. Preferably additional relatively short backwardly curved vanes are provided at or near to the inlet.

In a modified construction, the said ducts are preceded by one or more sets of auxiliary ducts (also formed between fixed vanes) which are backwardly curved and which are separated from the said ducts and from each other by spaces adapted to receive reaction vanes.

Preferably the vanes are made bulbous at the inlets of the ducts.

In order that the invention may be clearly understood and readily carried into effect, the same will now be more fully described with reference to the accompanying diagrammatic drawings by way of example, in which:

Figure 3 is a perspective view of parts of the impeller and of the turbine seen from a direction at right angles to the axis of rotation.

Figure 4 is a perspective view of another part of the turbine seen from a direction parallel to the axis.

Figure 6 is a part sectional, part perspective view on the line B—B of Figure 5.

Figure 7 is a similar view to that shown in Figure 6 on the line A—A of Figure 5. It will be noted that the views of Figures 6 and 7 overlap.

Figure 1:
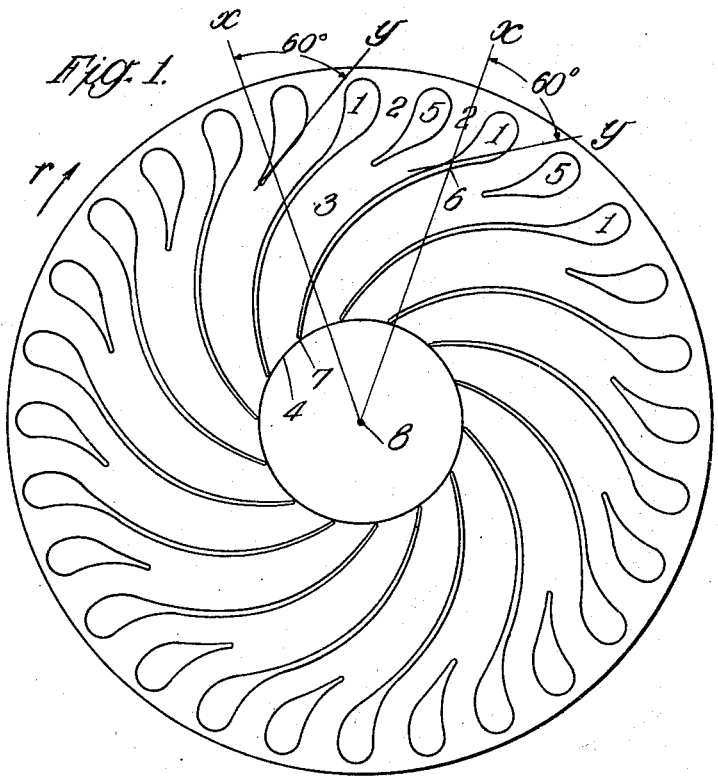
Figure 1 is a development in one plane of a turbine made according to this invention.

Referring to Figure 1—1, 6, 7, is one of the fixed vanes having a bulbous head 1 near the inlet of the duct 3. 4 is the outlet of the duct 3, which outlet is situated nearer the axis 8 of the turbine than the inlet. 5, 5 are short fixed vanes placed between the bulbous heads 1, 1 of the full length vanes, which vanes are of similar shape to the part 1 of the full length vanes 1, 6, 7. In the part 2 of the duct 3 which part is near the inlet (and in the embodiment shown is divided into two by the vanes 5, 5) the duct is curved backwards, the direction of rotation being shown by the arrow r. The change of direction imparted to the liquid in the part 2 is the angle between the lines x and y which in the example shown is about 60°. Thereafter the duct is oppositely curved in such a manner as to conform to what would be the direction of flow of the liquid in this part of the turbine before the turbine has begun to move if the part of each vane from 6 to 7 were absent.

Figure 1A:
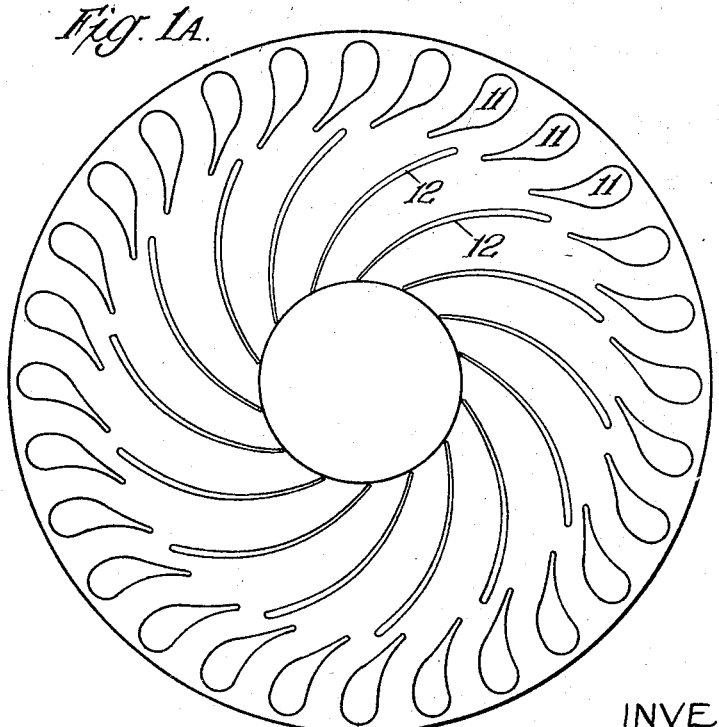
Figure 1A is a variant of the arrangement shown in Figure 1.

In the modified construction shown in Figure 1A, which may be more convenient to manufacture, the ducts are constituted by two series of vanes, viz. an outer series 11, 11 and an inner series 12, 12. The outer series 11, 11 which are situated near the inlet have a backwards curvature and the inner series 12, 12 which extend to the outlet are oppositely curved. The radial gap between the series 11, 11 and the series 12, 12 is sufficiently small to avoid undue shock.

Figure 2:
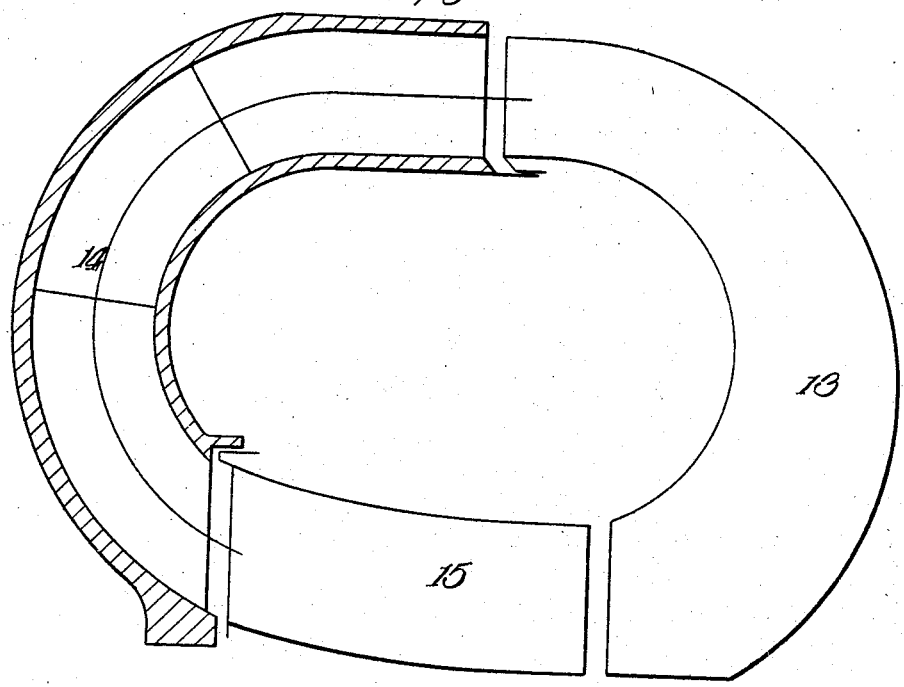
Figure 2 is a sectional view of the liquid circuit in a plane containing the axis of rotation.

Referring to Figure 2, 13 is the impeller, which is preferably constructed in the manner described and claimed in my co-pending application No. 200,136, filed April 5, 1938, 14 is the turbine with which this invention is concerned and 15 is a reaction member which is preferably constructed in the manner described and claimed in a co-pending application No. 231,869, filed September 27, 1938. The ducts of the turbine 14 extend throughout almost the full radial height of the circuit, and the pump impeller drives the turbine means of a liquid circulating in a closed circuit within a toroidal chamber.

Referring to Figures 3 and 4, 20 is the outer casing of the apparatus, 21, 21 are the delivery ends of the vanes of the impeller, and 22, 22' are vanes of the turbine. In the embodiment shown in these figures the vanes 22' extend from the inlet of the turbine to the outlet, while the vanes 22 are somewhat shorter but otherwise similar. The vanes 23 are still shorter. 24, 24 are ducts formed between the vanes 22', which ducts by reason of the curvature of these vanes are backwardly curved near the inlet and thereafter oppositely curved to the outlet. The vanes 23 are similar to the vanes 5 of Figure 1 and the vanes 22' to the vanes 1, 6, 7 of Figure 1.

Figure 5:
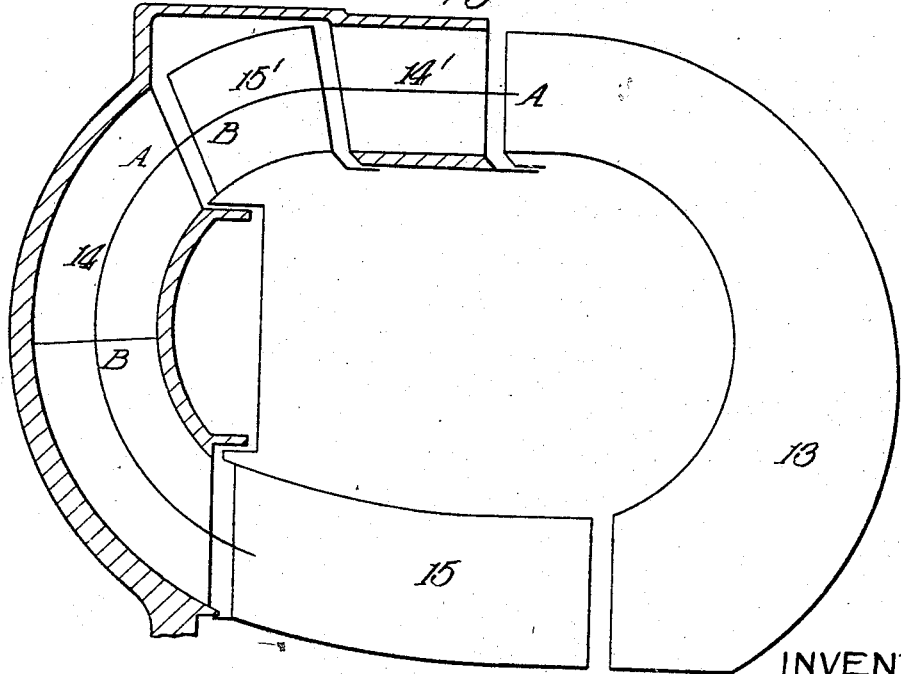
Figure 5 is a sectional view of the liquid circuit in a modified form of the apparatus.

Referring to Figure 5, which shows a modification, 13 is the impeller, the construction of which is the same as in Figure 2, but the turbine now consists of two parts 14, 14' and the reaction member also of two parts 15, 15', the part 15' of the reaction member being inserted between the parts 14, 14' of the turbine whilst the other part 15 is located between the outlet of the turbine and the inlet of the impeller. Referring to Figures 6 and 7, Figure 6 shows the vanes of the turbine part 14 (Figure 5) and Figure 7 shows the inlet ends of these vanes as well as a set of vanes 36 on the turbine part 14'. 30, 30 are vanes which extend from the inlet to the outlet and which are shaped to form between them the ducts 32 which are backwardly curved near the inlet and thereafter oppositely curved as in the previous construction. 31 indicate short vanes similar to the vanes 5 in Figure 1. As shown in Figure 7, the turbine has a set of auxiliary ducts 35, formed between the auxiliary vanes 36, preferably integral with the turbine part 14', which ducts 35 and vanes 36 precede the main ducts 32 and vanes 30 that extend throughout almost the full radial height of the circuit. The ducts 35 and vanes 36 of the auxiliary set are backwardly curved and are situated at a part of the circuit most remote from the axis. The reaction due to the backwards curvature of the auxiliary set of ducts assists to rotate the turbine. The vanes of the part 15' (Figure 5) of the reaction member are interposed in the space 37 between the auxiliary set of turbine vanes 36 and the main turbine vanes 30, 31 and these reaction vanes are so curved as to deflect the flow of the liquid forwardly, i. e. to the same direction as the direction of rotation and consequently the backwards curvature of the part near the inlet of the ducts 32 operates as before to tend to rotate the turbine, notwithstanding the presence of the preceding set of backwardly curved auxiliary ducts 35. One or more additional preceding sets of ducts and vanes can be similarly added, with reaction members between each set, to increase the starting effort if this is desired.

A further description to give a fuller understanding of the principles and operation is desirable. The apparatus involved is not a mere coupling but relates to hydraulic power transmission apparatus of the kind wherein a rotary impeller or driving member drives by means of a liquid circulating in a closed circuit a turbine or driven member having ducts the inlets whereof are disposed in the said circuit at a radius (i. e. at a radial distance from the axis of rotation) larger than the radius at which their outlets are disposed, said ducts being formed between vanes, and wherein the torque imparted by the hydraulic means to the turbine is or can be substantially greater than that imparted to the impeller whereby transmission of power may be effected by the hydraulic means at a torque ratio substantially greater than the ratio of 1 to 1 independently of any associated mechanical change speed gearing. This invention is concerned with the turbine unit, and is believed to be novel on the following principles.

Inasmuch as at all speeds, and during transmission at all ratios, the impeller or driving member of an hydrokinetic transmitter has to perform precisely the same function, the design of its vanes has to conform with no conflicting requirements. In the case of the driven member or turbine, however, the situation is less simple because, under conditions of transmission at the ratio of 1 to 1, the angular momentum of the liquid must be changed within the driven member by a mode somewhat differing from that by which it must be changed during transmission at the much higher ratios which are required at the start. The position is further complicated by the fact that, for transmission with optimum efficiency under all other conditions, the angular momentum of the liquid must be changed within the driven member by the two different modes simultaneously.

*Mode 1.*—Thus, to result in high starting torque, the angular momentum of the liquid must be changed within the driven member by deflection of the stream backwards relatively to the delivery ends of the vanes of the driven member.

*Mode 2.*—On the other hand, for efficient transmission at the ratio of 1 to 1, the change in the angular momentum of the liquid must be effected within the driven member by reduction of the rotational velocity of the liquid to the peripheral velocity at the delivery ends of the vanes of the driven member—only by this mode can large powers be transmitted at low velocities of flow.

*Mode 3.*—Lastly, for transmission at any ratio higher than 1 to 1 at any appreciable rotary speed, to avoid unduly high velocities of flow and therefore unnecessarily high losses, the change in the angular momentum of the liquid must be effected by a combination mode, i. e. by modes 1 and 2 simultaneously, the proportion of the work done by the mode 2 increasing both with decrease of ratio and with increase of rotary speed.

The difficulty in prior turbine member design has been that, to change the angular momentum of the liquid effectively by the first method mentioned, the deflection of the streams from the impeller impinging upon the driven member or turbine must be effected at the largest radius practicable having regard to the dimensions of the hydraulic circuit, and this was believed to necessitate the disposition of the delivery ends of the vanes of the driven member at such largest radius; whereas to enable the driven member to reduce the angular momentum of the liquid effectively by the second method mentioned, it needs vanes having their delivery ends disposed at the smallest radius practicable. The vane characteristics requisite for the best performance by these respective methods were thus believed to be incompatible, and it is mainly due to such belief that the oft propounded theory that transmission of power by hydrokinetic means cannot be performed efficiently at both the ratio of 1 to 1 and at a higher ratio by the same machine has secured universal if unmerited acceptance. Neither have the devices which have been proposed to overcome the difficulty, e. g. compound vanes, movable vanes, deformable vanes, proved of much avail; and these were otherwise objectionable and complicated.

The true solution lay in affording a turbine vane construction, neither compound nor movable, but immutable and permanently fixed to the driven member, which, when the driven member is stationary, would deflect the stream backwards in space at the major radius of the circuit notwithstanding the disposition of its delivery end at the minor radius of the circuit. A vaned turbine complying with these requirements is disclosed in the present invention; and its construction according to the new principle may be described as follows:

The inlets of the driven member are disposed substantially at the major radius of the toroidal hydraulic circuit, the outlets being substantially at the minor radius; the vanes and ducts therefore extend throughout the radial height of the circuit, from the inlet of the driven member to its outlet; the receiving ends of the vanes are, as previously mentioned, of bulbous formation; a deflecting curve backwards is formed in the vanes at their first parts near their receiving ends, such backcurve terminating at a point as far removed from the axis of rotation of the machine as practicable; the vanes are extended beyond such point inwardly to the outlets of the driven member in contours or helices conforming substantially with the natural path followed by the streams towards such outlet while the driven member, though under influence of torque, is stationary, this being a curvature in a sense the reverse of the backcurve of the first part.

The effect of this construction is that when the driven member is stationary, as at start, since the direction of the liquid has been definitely determined near to the outer radius, the helical second partions of the vanes in no way influence the momentum of the liquid flowing along them, being thus neutral and serving merely to canalize the vertical motion of the stream, the result of its circulatory velocity and of the tangential velocity in backwards sense imparted to it by the deflecting curve. The change in the angular momentum of the liquid is thus effected by the driven member under these conditions by deflection of the stream backwards at the largest radius practicable, notwithstanding the disposition of the delivery ends of the vanes at the minor radius of the circuit. The mode of action is as though the vane first parts only were present, the second parts omitted.

When, on the other hand, the driven member begins to rotate, the conditions change; the helical portions of the vanes, due to the lower peripheral velocity that obtains at their delivery ends as compared to their outer ends, cease to be wholly neutral, but they begin to influence the angular momentum of the liquid as it flows towards the general axis of the machine; such influence increasing with increase of rotational speed of the turbine, while the effect of the deflection backwards decreases in commensurate manner with increase of rotational speed. Thus mode 1 changes to mode 3 and both parts of the vanes function until speed increase brings 1 to 1 ratio.

It is found that the deflecting curve does not impair efficiency at the ratio of 1 to 1; inasmuch as the velocity backwards which it imparts to the liquid varies directly as the circulatory velocity of the stream, while the latter velocity varies at the speed of relative rotation of the driving and driven members, it follows that, apart from its decrease with increase of rotational speed, the effect of the deflection backwards decreases also with the ratio of transmission, becoming wholly negligible during transmission at the ratio of 1 to 1.

To sum up, when power is being transmitted by the second mode, or at the ratio of 1 to 1, however high or low the turbine's rotational speed, the change in the angular momentum of the liquid is effected within the turbine or driven member by reduction of the rotational velocity of the liquid to the peripheral velocity at the delivery ends of the vanes of the driven member, such ends being disposed at the smallest radius of the toroidal circuit—the method appropriate for transmission at the ratio of 1 to 1. When high starting torque has to be provided, the change in the angular momentum of the liquid is effected within the driven member by the method appropriate in such case, viz., the first mode, by deflection of the liquid backwards relatively to the delivery ends of the vanes of the driven member, the deflection taking place at the largest radius. During transmission at any ratio higher than 1 to 1 at any appreciable rotational speed the change in the angular momentum of the liquid is effected by modes 1 and 2 concomitantly, designated mode 3, the effect produced by each of modes 1 and 2 contributing that proportion of the transmitting work which, having regard to the conditions of power, speed and load prevailing at the time, can be done more efficiently by such mode; the entire operation and change from mode to mode being automatic notwithstanding the non-movable character of the vanes.

The expression "power transmission apparatus" as used herein is intended to indicate that the disclosed combination of driving impeller and driven turbine, with a liquid body in toroidal flow therethrough, and a reaction means or member between the turbine and impeller, is such as is adapted and adequate as a complete drive apparatus, for example for automobiles; for the reason that it is capable per se of imparting and does at times impart to the driven element or turbine a variable torque which is greater than that which the engine imparts to the impeller; so that under conditions of reduced or zero rotational speed of the driven parts a high torque is thus made available, as is necessary, without the need of any conventional or other gear shift means; wherefore the transmitter hereof is distinguished from a mere hydraulic coupling such as has been proposed in various forms.

While the central and other general parts of the disclosed apparatus are not illustrated in the drawings hereof, they will be understood to include driving, driven and stationary members, at or concentric with the axis, and connected respectively with the impeller, the turbine and the reactor, in accordance with the structural principles generally indicated in applicant's prior Patent No. 2,173,428 of September 19, 1939 or his British Patent No. 456,277 of 1935; or more particularly as shown in detail in applicant's companion application, Serial No. 231,869, filed Sept. 27, 1938, to which reference may be made for the structure of the general and central parts not herein illustrated.

What I claim and desire to secure by Letters Patent of the United States is:

1. Hydraulic power transmission apparatus adapted to deliver variable speed and torque with driven torque exceeding driving torque under speed reduction conditions, the same comprising a vaned pump impeller, a vaned turbine and a vaned reaction member as described, the impeller driving the turbine by means of a liquid circulating in a closed circuit within a toroidal chamber, the said turbine having a part in which ducts, commencing at or near to their inlets, have a backwards curvature so as to deflect the liquid as it flows through this part in a direction having a component relatively to the turbine which is opposite to the direction of rotation of the impeller, which ducts thereafter have a general curvature opposite to the first-mentioned curvature, and the vane portions which have the general opposite curvature to the backwards curvature of the vane portions at the inlets, being separate from the said backwardly curved portions.

2. A hydraulic variable-speed power transmitter of the kind which constitutes per se a drive apparatus that gives torque increase at high load under reduced and zero speed conditions, the same having a driving impeller member and a driven turbine member each comprising enclosing annular walls with interior duct-forming vanes and the two rotatable in vis-a-vis relation about a common axis, and a reaction means between said members, with a liquid mass confined to a flow around a toroidal circuit first outwardly with respect to the rotation axis through the impeller ducts and thence by discharge therefrom as an annular stream to pass across with axial component thus to enter smoothly the turbine ducts and flow inwardly in the latter for discharge therefrom to the reaction means and recirculation; characterized in that the enclosing walls and vanes of the turbine are of form to define a series of ducts each of which has its inlet substantially at the major and its outlet substantially at the minor radius of the liquid circuit so that the duct has substantially the full radial extent of the circuit, and each duct having in development commencing with its inlet a two-part curvature substantially of the character of an ogee or long-S-curve, the duct first part being to a substantial extent backcurved i. e. away from a radial plane in a direction opposite to that of the forward rotation of the impeller, and its second part being of substantial curvature in the reverse sense and extending to the outlets; whereby the liquid by its velocity flow inwardly along such ducts can deliver torque thrust to the turbine at starting and intermediate ratios largely by reaction against the backcurved first parts of the vanes, whereas at intermediate and 1 to 1 ratios torque is delivered largely by reaction against the reversely curved second parts of the vanes, which second parts are substantially neutral at starting operation.

3. A transmitter as in claim 2 and wherein the first and second vane parts of each vane are integral affording continuous S-shape vanes extending from inlet to outlet.

4. A transmitter as in claim 2 and wherein between the backcurved first parts of the main vanes are additional short backcurved vanes, and all of said main and short vanes have their inlet ends enlarged into bulbous form.

5. A transmitter as in claim 2 and wherein each duct first part initially extends inward substantially in a radial plane, then sweeps progressively with backcurve to a substantial angle to such plane, of the order of 60° more or less, until reaching a transition point somewhat nearer the inlet than outlet; followed by a long easy curve in reverse sense from the transition point to the outlet.

6. A transmitter as in claim 2 and wherein are continuous turbine vanes each curved from inlet to outlet, the first part of each being notably convex in the rotation direction, and the second part being a smooth continuation thereof but notably concave in the rotation direction with a curvature which is substantially neutral and without substantial influence in the flow during starting when the turbine is substantially stationary.

7. A hydraulic variable-speed power transmitter of the kind which constitutes per se a drive apparatus that gives torque increase at high load under reduced zero speed conditions, the same having a driving impeller member and a driven turbine member each containing ducts and the two rotatable in axially spaced relation about a common axis, and a reaction means between said members, with a liquid mass confined to flow around a toroidal circuit first outwardly with respect to the rotation axis through the impeller ducts and thence by discharge therefrom as an annular stream to pass with axial component to enter smoothly the turbine ducts and flow inwardly in the latter for discharge therefrom to the reaction means and recirculation; characterized in that the turbine comprises walls of form to define a series of ducts each of which has its inlet near the major radius and its outlet near the minor radius of the toroidal circuit, and each duct having in its development (commencing with its inlet) a two-part reversing curvature, the duct first part being notably backcurved i. e. away from a radial plane in a direction opposite to that of the forward rotation of the impeller, and its second part being of longer extent than the first, extending to the outlet, and of a substantial curvature which substantially conforms to the natural inflow path when the turbine is stationary; whereby the liquid by its velocity flow inwardly along such ducts delivers effective torque thrust to the turbine by reaction against the vanes, at starting, at intermediate speed conditions and at 1 to 1 ratio.

PIERO MARIANO SALERNI.